United States Patent [19]
Watanabe et al.

[11] Patent Number: 5,170,428
[45] Date of Patent: Dec. 8, 1992

[54] DATA COMMUNICATION APPARATUS

[75] Inventors: Tsunehiro Watanabe; Motoaki Yoshino; Masatomo Takahashi; Shigeo Miura, all of Tokyo; Takeshi Toyama, Hiratsuka, all of Japan

[73] Assignee: Canon Kabushiki Kaisha, Tokyo, Japan

[21] Appl. No.: 569,738

[22] Filed: Aug. 22, 1990

Related U.S. Application Data

[63] Continuation of Ser. No. 75,655, Jul. 20, 1987, abandoned.

[30] Foreign Application Priority Data

Jul. 23, 1986 [JP] Japan .................................. 61-174049
Aug. 4, 1986 [JP] Japan .................................. 61-183025

[51] Int. Cl.⁵ .................................................. H04M 11/00
[52] U.S. Cl. ........................................ 379/94; 379/100; 358/402; 358/407
[58] Field of Search ........................ 379/94, 100, 211; 358/400, 402, 405, 407; 340/717

[56] References Cited

U.S. PATENT DOCUMENTS

| | | | |
|---|---|---|---|
| 3,678,180 | 7/1972 | Bond | 358/257 |
| 3,920,896 | 11/1975 | Bishop et al. | 358/257 |
| 3,976,995 | 8/1976 | Sebestyen | 340/717 |
| 4,000,391 | 12/1976 | Ogawa | 358/257 |
| 4,055,729 | 10/1979 | Vandling | 358/257 |
| 4,058,838 | 11/1977 | Crager et al. | 358/257 |
| 4,532,379 | 7/1985 | Tsukioka | 358/407 |
| 4,607,289 | 8/1986 | Kurokawa | 358/257 |
| 4,677,660 | 6/1987 | Yoshida | 379/100 |
| 4,746,986 | 5/1988 | Tanigawa | 358/256 |
| 4,752,951 | 6/1988 | Konneker | 379/211 |

FOREIGN PATENT DOCUMENTS 2089618 6/1982 United Kingdom .

Primary Examiner—Ulysses Weldon
Assistant Examiner—M. Fatahiyar
Attorney, Agent, or Firm—Fitzpatrick, Cella, Harper & Scinto

[57] ABSTRACT

A data communication apparatus comprises: a memory to store data which is sent from a station for requesting the repeating multiple-address transmission; a transmitter to transmit the data stored in the memory to a repeating multiple-address reception station; a discriminating circuit to discriminate whether the transmission from the request station has been performed via a first route or via a second route; and a deciding circuit to decide whether the repeating multiple-address transmission is performed to the repeating multiple-address reception station or not on the basis of the discrimination by the discriminating circuit. The first route is the route via the telephone network for use in communication of voice and data. The second route is the route via the data communication network only for use in data communication. By previously storing the data of the repeating multiple-address reception station corresponding to the station for requesting the repeating multiple-address transmission, the repeating multiple-address transmission can be performed without instructing the repeating multiple-address reception station from the request station.

7 Claims, 9 Drawing Sheets

DATA COMMUNICATION APPARATUS

This application is a continuation of application Ser. No. 07/075,655 filed Jul. 20, 1987 now abandoned.

BACKGROUND OF THE INVENTION

1. Field of the Invention

The present invention relates to a data communication apparatus.

2. Related Background Art

Hitherto, in such apparatus, e.g., in a facsimile apparatus, as shown in U.S. Pat. No. 4,607,289, a partner for requesting a repeating multiple-address transmission is preliminarily registered in a repeater station, and the repeating multiple-address transmission is performed for only the registered partner. Similarly, according to the apparatus disclosed in U.S. patent application Ser. No. 813,514, data is transferred to the registered partner.

However, in those apparatuses, it must be discriminated whether the partner has been registered or not for all of the incoming calls and the repeating multiple-address reception station must be selected from the station for requesting the repeating multiple-address transmission to the repeater station, so that there is a drawback such that the procedure is troublesome and takes a long time.

In addition, there is a drawback such that after the repeating multiple-address transmission is performed, the result cannot be known at the station for requesting the repeating multiple-address transmission or at the control station.

SUMMARY OF THE INVENTION

It is an object of the present invention to eliminate the foregoing drawbacks.

Another object of the invention is to improve a data communication apparatus.

Still another object of the invention is to provide a data communication apparatus for deciding whether or not the repeating multiple-address transmission is performed on the basis of such a point that from which network the transmission from the station for requesting the repeating multiple-address transmission was performed.

Still another object of the invention is to provide a data communication apparatus in which, by previously storing the data at the repeating multiple-address reception station corresponding to the station for requesting the repeating multiple-address transmission, the repeating multiple-address transmission can be performed without instructing the repeating multiple-address reception station from the station for requesting the repeating multiple-address transmission.

Still another object of the invention is to provide a data communication apparatus which returns the result of the repeating multiple-address transmission to the station for requesting the repeating multiple-address transmission.

Still another object of the invention is to provide a data communication apparatus which returns the result of the repeating multiple-address transmission to the repeating result return destination registered in correspondence to the station for requesting the repeating multiple-address transmission.

Still another object of the invention is to provide a data communication apparatus for controlling in accordance with a route through which data from a partner apparatus was transmitted.

The above and other objects and features of the present invention will become apparent from the following detailed description and the appended claims with reference to the accompanying drawings.

DETAILED DESCRIPTION OF PREFERRED EMBODIMENTS

Figure 1:
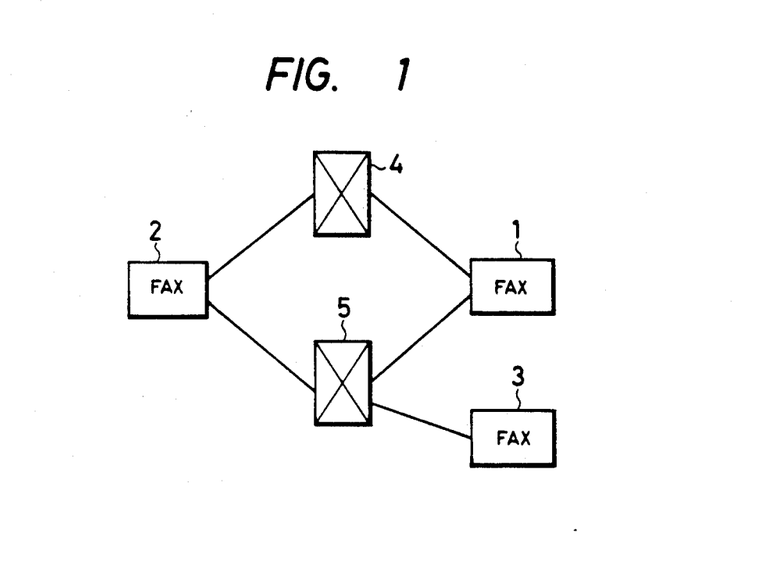
FIG. 1 is a diagram for explaining the repeating multiple-address transmission of the first embodiment.

An embodiment using the present invention will be described hereinbelow. FIG. 1 is a diagram for explaining the repeating multiple-address transmission in the first embodiment. In the diagram, reference numeral 1 denotes a facsimile apparatus as a repeater station for performing the repeating multiple-address transmission; 2 is a facsimile apparatus for requesting the repeating multiple-address transmission; 3 a facsimile apparatus for receiving the repeating data from the facsimile apparatus 1; 4 a data communication network which is used for only the data communication or for the communication of digital data; and 5 a telephone network which is used for the communication of voice and data.

Figure 2:
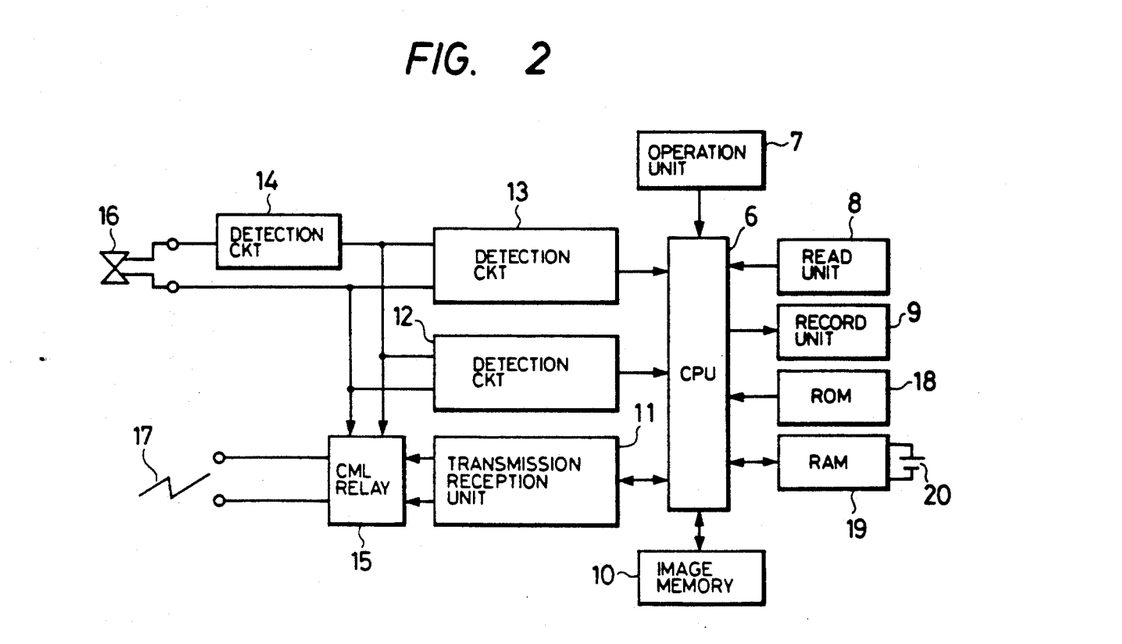
FIG. 2 is a block diagram showing a facsimile apparatus in the first embodiment.

FIG. 2 is a block diagram showing an embodiment of the invention.

Reference numeral 6 denotes a CPU to control the whole apparatus; 7 is an operation unit to input a telephone number and the like; 8 a read unit to read an original document; 9 a record unit; 10 an image memory to store image data upon transmission and reception; 11 a selection signal transmission unit to the network and a transmission/reception unit of a procedure signal and an image signal; 12 a detection circuit of a facsimile call signal (for example, 1300 Hz in the case of the facsimile network of NTT (Nippon Telegraph and Telephone Corporation)) which is incoming from the data communication network; 13 a detection circuit of a call signal (16 Hz) which is incoming from the telephone network; 14 a hook detection circuit to detect the state (ON or OFF) of the receiver of a telephone set which is connected to the facsimile apparatus; 15 a CML relay to switch between the transmission/reception unit 11 and a main telephone set 16 or among the detection circuits 12 to 14; 16 the main telephone set; 17 a circuit; 18 an ROM in which a control program is stored; 19 an RAM in which various kinds of telephone numbers of a partner for permitting the repeating multiple-address transmission, repeating multiple-address reception station, and the like are stored; and 20 a battery to back up the content of the RAM 19.

Figure 3:
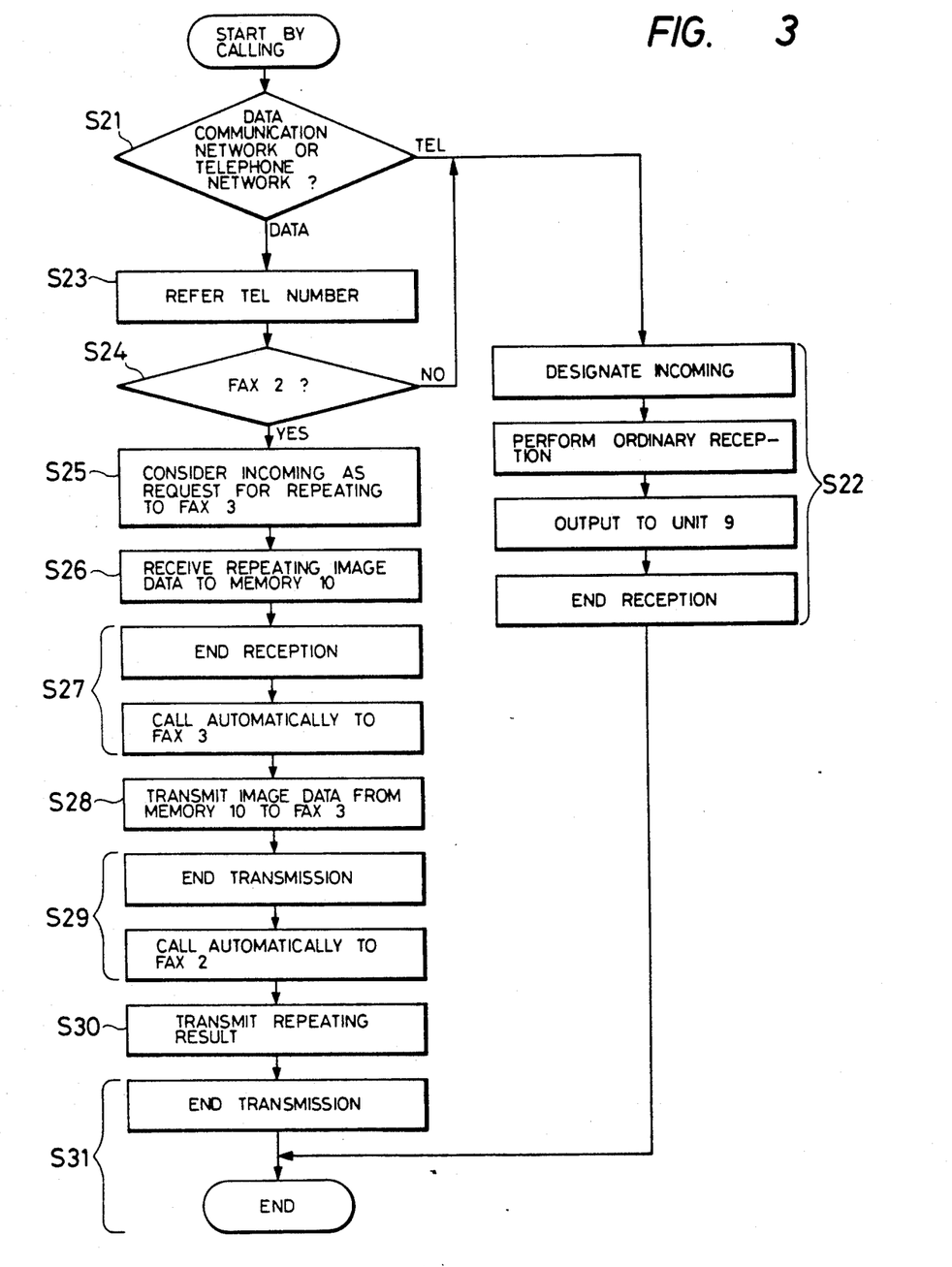
FIG. 3 is a flowchart showing the operation of the facsimile apparatus 1 in FIG. 1.

FIG. 3 is a flowchart showing the operation of the facsimile apparatus 1 (repeater station) shown in FIG. 1.

In the constitutions shown in FIGS. 1 and 2, the telephone number of the partner facsimile apparatus 2 (the station for requesting the repeating multiple-address transmission) which receives a repeating instruction from the operation unit 7 and the telephone number of the facsimile apparatus 3 at the repeating multiple-address reception side are previously correspondingly registered in the facsimile apparatus 1. For the calls incoming from the station for requesting the repeating multiple-address transmission, if the network through which a signal is transmitted is the data communication network (facsimile network of the NTT), it is determined that the repeating has been requested. On the other hand, if this network is the telephone network, it is determined that the communication to the station itself has been made. The foregoing data is stored in the RAM 19. If an incoming call was made to the facsimile apparatus 1, the facsimile apparatus 1 operates in a manner as shown in FIG. 3. The operation will now be described hereinafter.

(S21) A check is made by the detection circuits 12 and 13 of the call signals to see if the incoming call has been made through the data communication network or the telephone network.

(S22) If the incoming call has been performed through the telephone network, it is determined that the communication to the station itself has been performed. The ordinary reception is executed and the processes are finished.

(S23) If the incoming call has been performed through the data communication network, it is checked whether the telephone number of the partner has been sent from the facsimile apparatus 2 for permitting the repeating multiple-address transmission or not by referring to the telephone number of the facsimile apparatus 2 for permitting the repeating multiple-address transmission which is stored in the RAM 19 by use of a transmission subscriber identification (TSI) signal in the procedure signals which are sent from the network.

(S24) If the incoming telephone number does not coincide with the telephone number of the facsimile apparatus 2 stored in the RAM 19, this incoming call is also regarded as an incoming call to the station itself and the ordinary reception is performed (the same as step S22).

(S25) If the incoming call has been performed from the facsimile apparatus 2 for permitting the repeating multiple-address transmission, this incoming call is regarded as an incoming call for requesting the repeating to the facsimile apparatus 3 which has been stored in the RAM 19 in correspondence to the TSI.

(S26) The repeating image data is received and stored into the image memory 10.

(S27) After completion of the reception, an originating call is automatically performed to the facsimile apparatus 3 as the repeating multiple-address reception station.

(S28) The repeating image data stored in the image memory 10 and transmitted from the facsimile apparatus 2 as the station for requesting the repeating multiple-address transmission is sent to the facsimile apparatus 3 as the repeating multiple-address reception station.

(S29) After completion of the transmission, an originating call is automatically performed to the facsimile apparatus 2 as the station for requesting the repeating multiple-address transmission.

(S30) The result of the repeating multiple-address transmission to the facsimile apparatus 3 is transmitted to the facsimile apparatus 2.

(S31) All of the processes are finished at the end of the transmission of the repeating result.

In the foregoing embodiment, an explanation has been made with respect to the case where a single repeating multiple-address reception station and a single partner for permitting the repeating multiple-address transmission are provided for simplicity of explanation. However, a plurality of partners which are permitted and a plurality of repeating multiple-address reception stations corresponding thereto may be also stored in the RAM 19. On the other hand, while the repeating image data is being stored into the image memory 10, an originating call is performed to the facsimile apparatus 3 as the repeating multiple-address reception station and the repeating data may be also transmitted.

Figure 4:
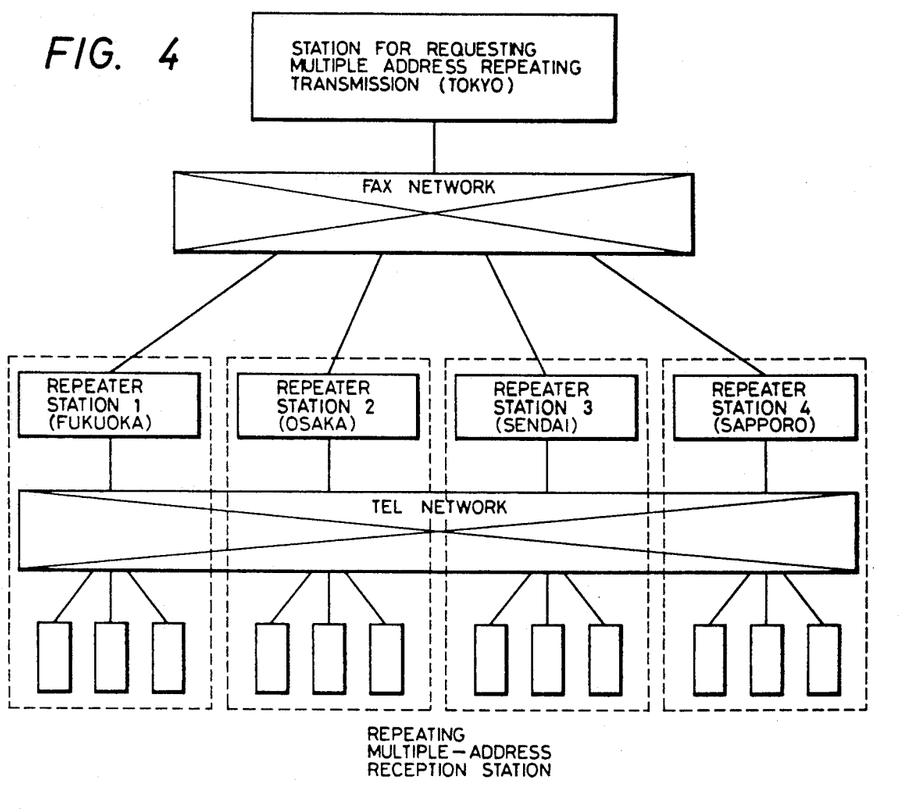
FIG. 4 is a diagram showing an example of a constitution using the first embodiment.

FIG. 4 is a diagram showing an example of a constitution using the present invention. This diagram shows an example in which repeating data is multiple-address transmitted to a plurality of partners for permitting the repeating multiple-address transmission and to a plurality of repeating multiple-address reception stations in correspondence thereto.

As an example of the data communication network, the charge of the facsimile communication network of the NTT is relatively cheaper at a long-distance district and is relatively expensive in the same district or neighboring district as compared with the charge of the telephone network. Therefore, as shown in FIG. 4, when a long distance exists between the station for requesting the repeating multiple-address transmission and the repeater station, the facsimile communication network is used. When short distance exists between the repeater station and the repeating multiple-address reception station, the telephone network is used. By using this constitution, the communication cost can be remarkably reduced as compared with the conventional apparatus.

As described in the foregoing embodiment, the telephone number of the station for requesting the repeating multiple-address transmission and the telephone number of the repeating multiple-address reception station are previously registered in a facsimile apparatus having the function for the repeating multiple-address transmission. An originating call is automatically performed to this facsimile. Therefore, there is no need to indicate the telephone number of the repeating multiple-address reception station from the station for requesting the repeating multiple-address transmission.

In addition, even in the case of performing a data communication using the data communication network, the communication of the repeating multiple-address transmission can be also performed.

In the foregoing embodiment, when an incoming call was performed through the data communication network from the station for requesting the repeating multiple-address transmission, this incoming call is regarded as a request for the repeating. When an incoming call was performed through the telephone network, the incoming call is regarded as a communication to the station itself. However, this constitution can be also reversed. This case is effective when the distance between the station for requesting the repeating multiple-address transmission and the repeater station is short.

Figure 5:
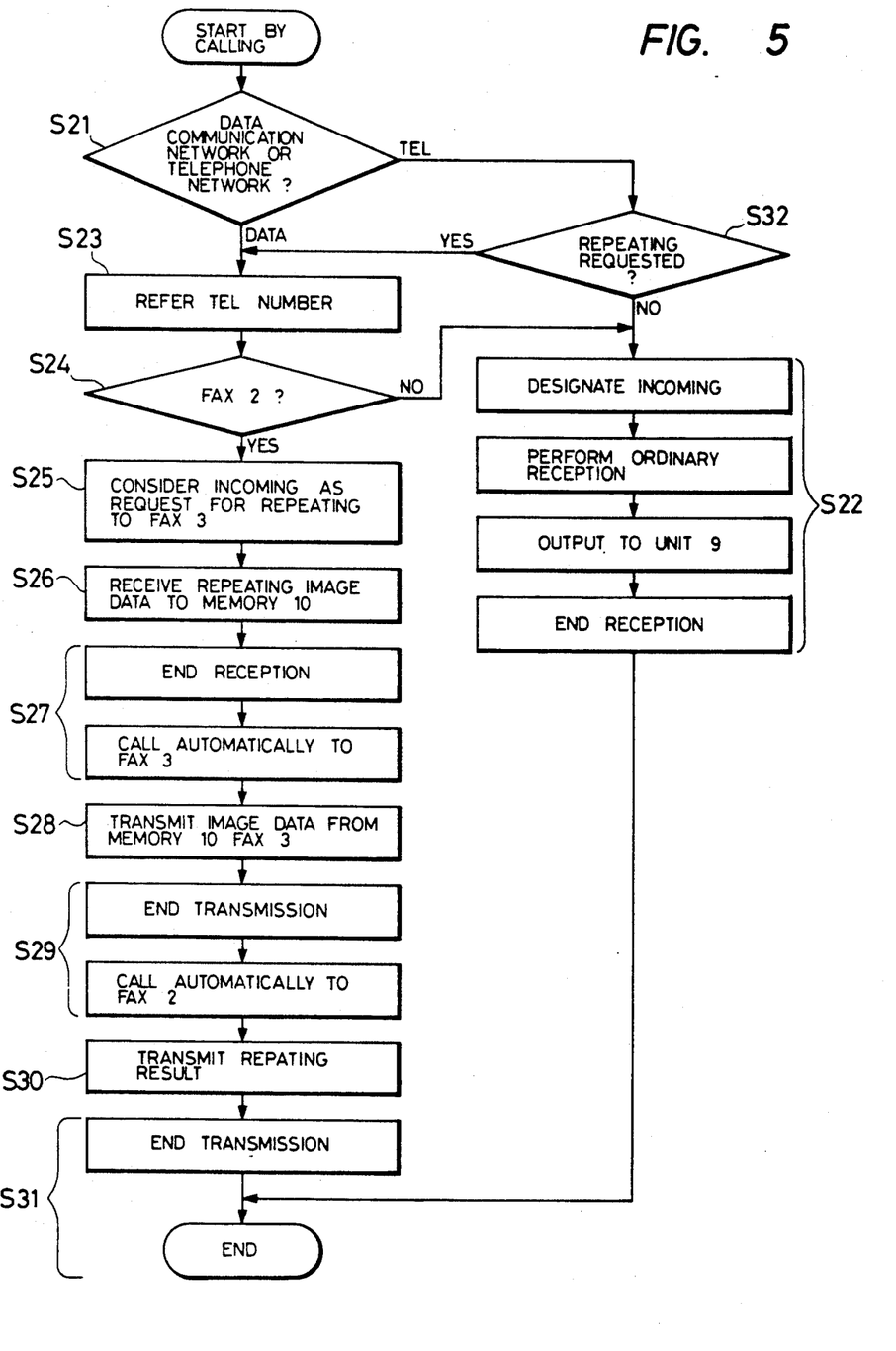
FIG. 5 is a flowchart showing another operation of the facsimile apparatus 1 in FIG. 1.

On the other hand, even when an incoming call was performed through the telephone network, if the repeating is requested from the station for requesting the repeating multiple-address transmission, the communication of the repeating multiple-address transmission can be performed by providing selecting means (S32) for the facsimile apparatus as the repeater station. FIG. 5 shows a flowchart for this embodiment. In FIG. 5, when an incoming call was performed through the telephone network, if the repeating is requested and the partner transmission station is the registered transmission station, the repeating communication is performed to the repeating reception station which has previously been registered.

On the other hand, in the foregoing embodiment, the repeater station receives the image data for repeating which is sent from the station for requesting the repeating multiple-address transmission and stores this image data into only the image memory 10 and this repeater station performs the repeating multiple-address transmission to the repeating multiple-address reception station. Therefore, although no data is output from the record unit in the repeater station, by also presetting this image data, it can be also simultaneously output in the station itself.

The data communication using the facsimile apparatus has been described in the foregoing embodiment. However, the invention can be also similarly applied to another data communication apparatus, e.g., a telex to communicate character code data.

As described above, according to the foregoing first embodiment, whether the repeating multiple-address transmission is performed or not is decided on the basis of through which route the transmission from the station for requesting the repeating multiple-address transmission has been performed. Due to this, for all of the incoming calls, there is no need to discriminate whether the partner has been registered or not.

In addition, there is no need to indicate the telephone number of the repeating multiple-address reception station from the station for requesting the repeating multiple-address transmission. The communication of the repeating multiple-address transmission can be performed at a high speed.

The second embodiment will now be described in detail hereinbelow with reference to the drawings.

Figure 6:
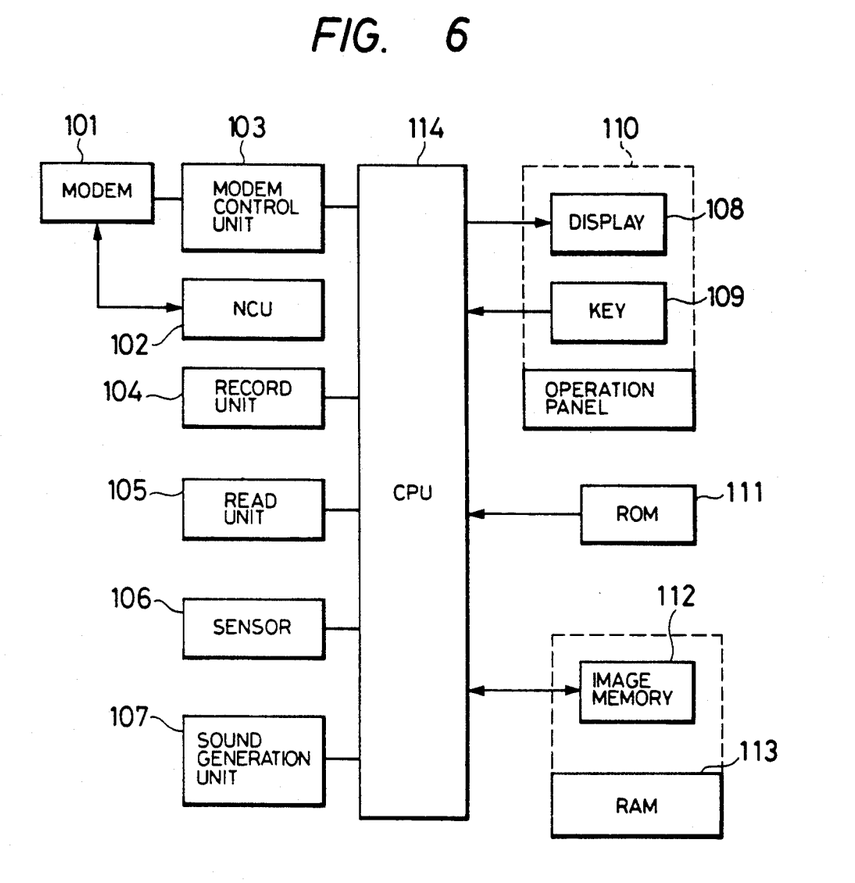
FIG. 6 is a block diagram showing a facsimile apparatus in the second embodiment.
Figure 7:
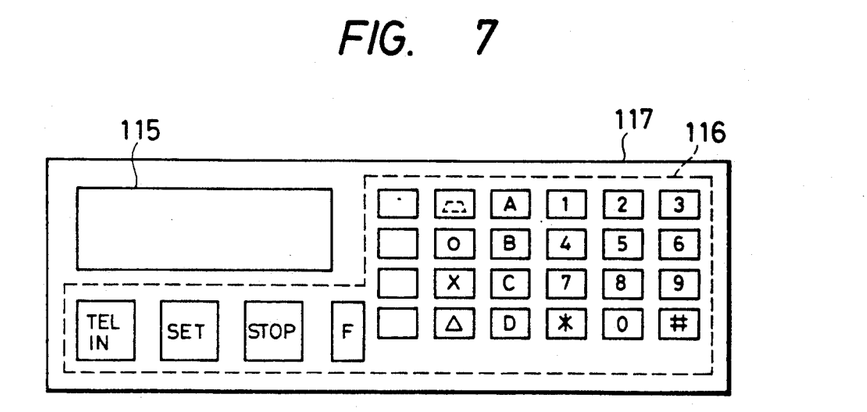
FIG. 7 is an external view showing an operation panel in FIG. 6.
Figure 8:
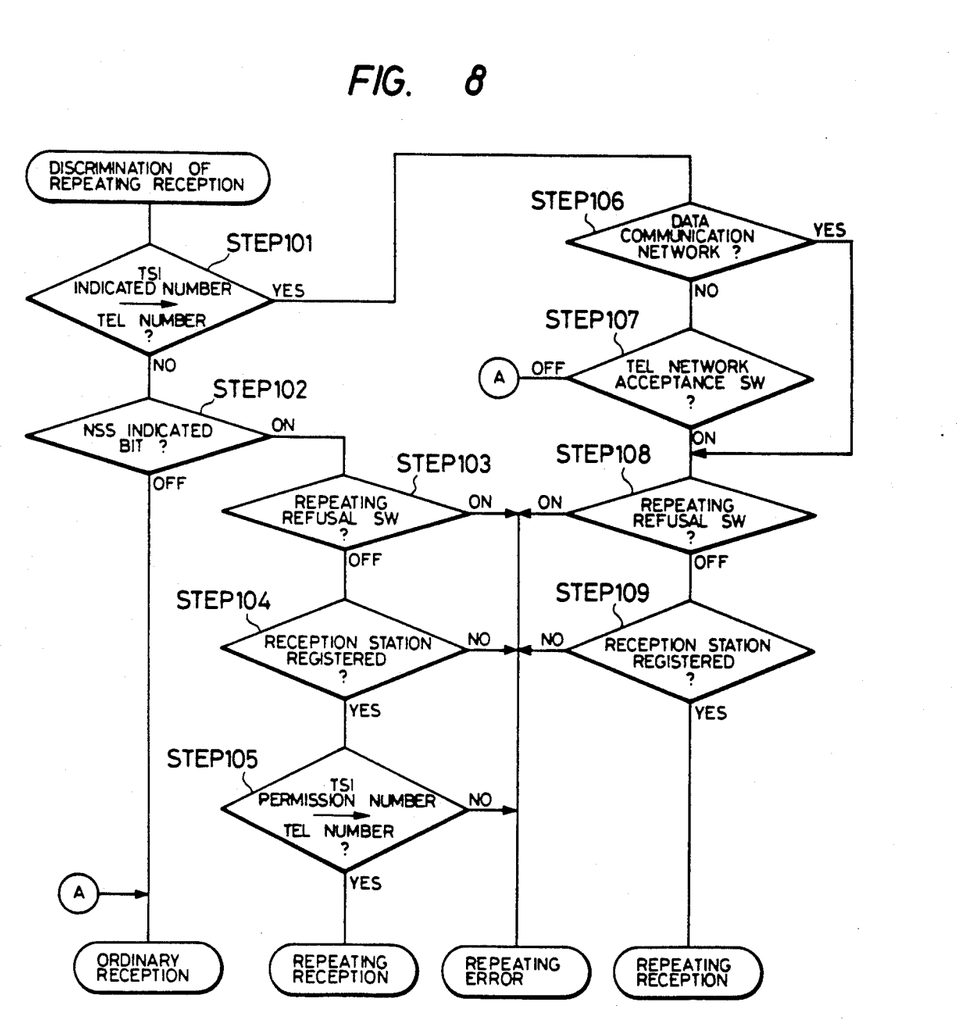
FIGS. 8, 10, and 12 are flowcharts showing the operation of the second embodiment.
Figure 9:
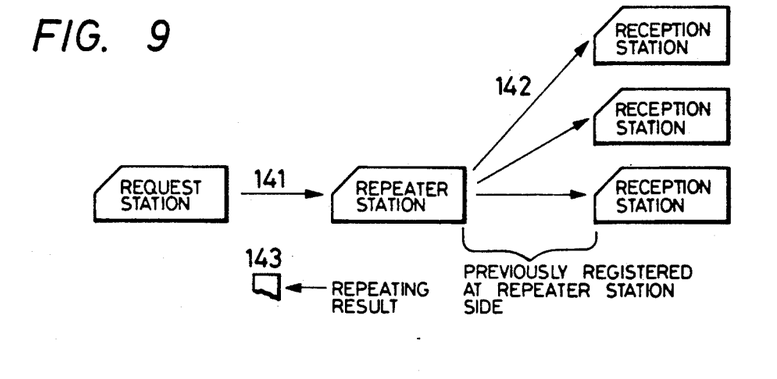
FIGS. 9 and 13 are diagrams for explaining the repeating multiple-address transmission in the second embodiment.
Figure 10:
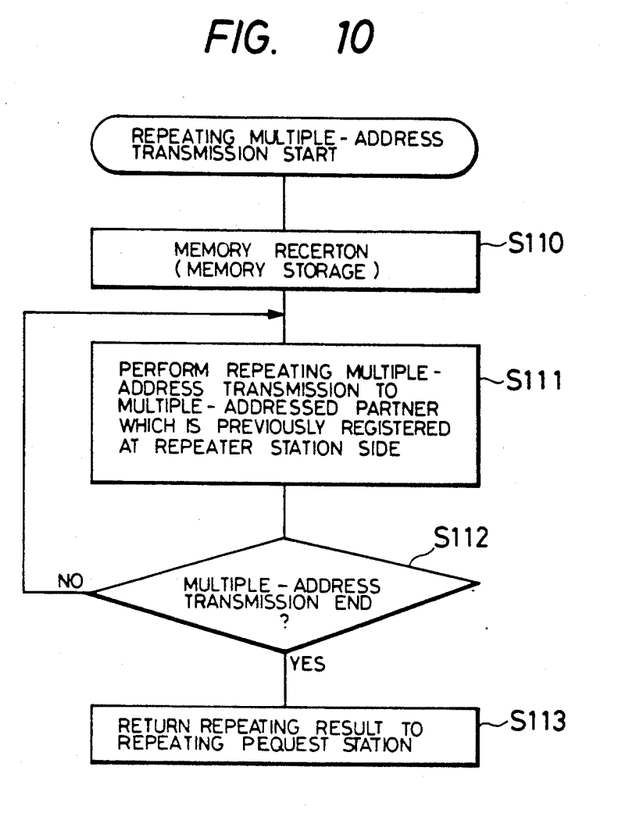
Figure 11:
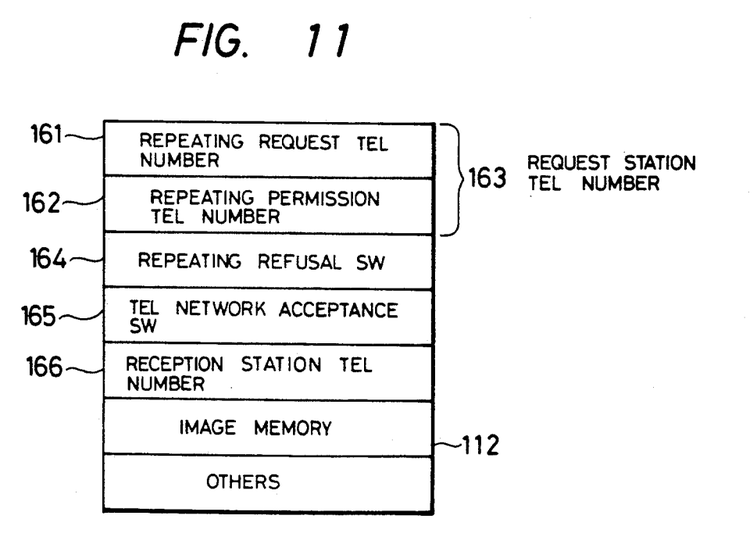
FIGS. 11 and 14 are diagrams showing internal regions of RAM in FIG. 6.

FIG. 6 is a block constitutional diagram of a facsimile apparatus of the second embodiment. FIG. 7 is an external view of an operation panel in FIG. 6. FIGS. 8 and 10 are flowcharts showing the operation of the second embodiment. FIG. 9 is a diagram for explaining the repeating multiple-address transmission. FIG. 11 is a diagram for explaining an internal region of a RAM in FIG. 6.

In FIG. 6, reference numeral 101 denotes a modem to perform the communication; 102 an NCU to connect a circuit with the telephone set side or modem; 103 a modem control unit to control the modem 101 and NCU 102; 104 a record unit to record a received image onto a recording paper; 105 a read unit to read an original document by a CCD or the like; 106 sensors to detect the presence or absence of recording papers, original document, and the like; 107 a sound generation unit to inform the occurrence of an error or the like to the operator by a sound; 108 a display to display the state of facsimile apparatus or the like to the operator; 109 a KEY consisting of numeral keys and the like; 110 an operation panel including the display 108 and KEY 109; 111 an ROM to determine the specification of the facsimile apparatus; 112 an image memory to store the readout image data and the like of the original document; 113 an RAM including the image memory 112; and 114 a central processing unit (CPU) to control the components 101 to 113, respectively. The CPU 114 is constituted by a microcomputer and peripheral apparatuses thereof.

In FIG. 7, numeral 115 denotes a display; 116 indicates keys; and 117 an operation panel including the display 115 and keys 116.

In the foregoing constitution, when the station for requesting the repeating multiple-address transmission desires the repeating multiple-address transmission and requests the repeater station to perform the repeating multiple-address transmission, the repeater station checks the following items whether:

(A) The apparatus itself has a usable memory.

(B) The telephone number of the station for requesting the repeating has been transmitted by the TSI signal.

(C) The NSS repeating request bit from the station for requesting the repeating is set to ON or "the repeating request station TEL number" registered in the apparatus itself coincides with the TEL number in the item (B).

(D) "The repeating permission TEL number" registered in the apparatus itself coincides with the TEL number in the item (B).

(E) The repeating refusal bit in the user's software SW is set to "the repeating is performed".

If these conditions are satisfied, the repeater station performs the memory reception (hereinafter, referred to as a repeating reception) in order to perform the repeating multiple-address transmission. FIG. 8 shows a flowchart for explaining those operations.

As shown in FIG. 11, the regions for storing a request station TEL number 163 consisting of a repeating request TEL number 161 and a repeating permission TEL number 162, a repeating refusal SW 164, a TEL network acceptance SW 165, and a reception station TEL number 166 are provided in the RAM 113 of the facsimile apparatus in the embodiment. The TEL numbers 161 and 162, which are generally referred to as a reference numeral 163, correspond to the regions to store the TEL number of the partner station for requesting the repeating. Between them, the region 161 is provided for the facsimile apparatus which performs the communication in the original (unique) mode and the region 162 is provided for the facsimile apparatus according to the other CCITT, T30. The region 164 is provided to decide whether or not a request for performing the repeating is refused when the repeater station received this request. The region 165 is provided to decide whether the repeating multiple-address transmission is performed or not for the incoming call from the telephone network. The region 166 is provided to store the TEL number of the repeating multiple-address reception station which performs the communication of the repeating multiple-address transmission when a request for the repeating was accepted.

The operation will now be explained with reference to the flowchart of FIG. 8, showing the control operation of the CPU 114 to decide whether the repeating reception is performed or not. The control program to execute this flowchart is stored in the ROM 111.

First, in step 101, the repeater station compares the TEL number of the partner transmitter declared in the TSI signal with the lower few digits (e.g., lower four digits are assumed) of the repeating request TEL number registered in the self apparatus. When they coincide, step 106 follows. When they differ, step 102 follows. In step 102, the repeating indicated bit on the non-standard apparatus setting signal (NSS signal) is checked to see if it has been set to "1" (ON) or not. If it has been set to "0" (OFF), namely, when the partner transmission station did not request for the repeating, the ordinary reception is directly executed. If it has been set to "1", namely, when the partner transmission station requested for the repeating, step 103 follows. In step 103, a check is made to see if the repeating refusal SW has been set to ON or OFF. If it has been set to ON, this means that a repeating error occurred and the repeater sends a DCN to the partner. If it has been set to OFF, step 104 follows. In step 104, a check is made to see if the repeating multiple-address partner reception station has been registered in the apparatus itself or not. If NO, this means that a repeating error occurred. If YES, step 105 follows. In step 105, the characters other than the numerals of 0 to 9 of the repeating permission TEL number registered in the apparatus itself are deleted and the remaining lower four digits of numerals are compared with the TEL number of the partner transmitter declared in the TSI signal. If they coincide, the repeating reception is performed. If they differ, this means that a repeating error occurred. The case where the processing routine advances to step 106 will now be described. In step 106, a check is first made to see if the telephone circuit has been connected to the data communication network, e.g., facsimile network (F network) of the NTT (Nippon Telegraph and Telephone Corporation) or not. If YES, step 108 follows. If NO, step 107 follows. In step 107, a check is made to see if the TEL number network acceptance SW registered in the self apparatus has been set to ON or OFF. If it has been set to ON, step 108 follows. If it has been set to OFF, the ordinary reception is executed. In step 108, a check is made to see if the repeating refusal SW has been set to ON or OFF. If it has been set to ON, this means that a repeating error occurred. The repeater sends a cut command (DCN) to the partner. If it has been set to OFF, step 109 follows. In step 109, a check is made to see if the repeating multiple-address partner reception station has been registered in the self apparatus or not. If NO, this means that a repeating error occurred. If YES, the repeating reception is executed.

The operation of the repeating multiple-address transmission will now be described with reference to an operation flowchart for the CPU 114 in FIG. 10. First, the repeater station performs the memory reception (repeating reception) in order to perform the repeating multiple-address transmission (S 110). After completion of the repeating reception, the repeater station performs the multiple-address transmission to the multiple-address partner reception station which has previously been registered in the apparatus itself (S 111). After completion of this transmission (S 112), the repeating result is returned to the repeating request station TEL number registered in the repeater station (S 113).

FIG. 9 shows the foregoing signal flow. The repeating multiple-address transmission is performed in accordance with a flow of a repeating request 141, a repeating multiple-address transmission 142, and a repeating result return 143.

In FIG. 11, the request station TEL number, repeating refusal SW, telephone network acceptance SW, and reception station TEL number which are stored in the RAM can be input, set, and erased by operating the keys shown at 116 in FIG. 7.

Figure 12:
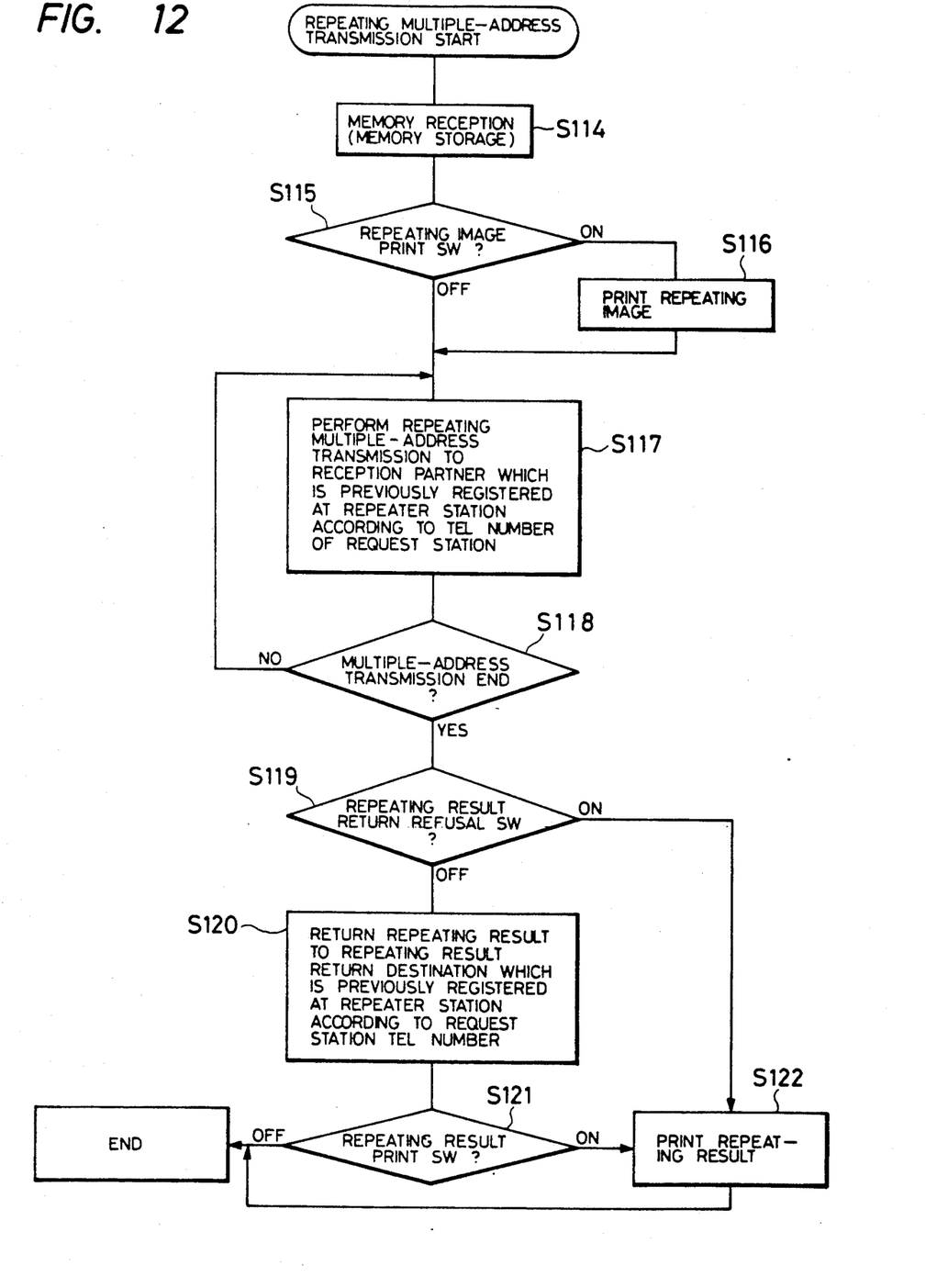
Figure 13:
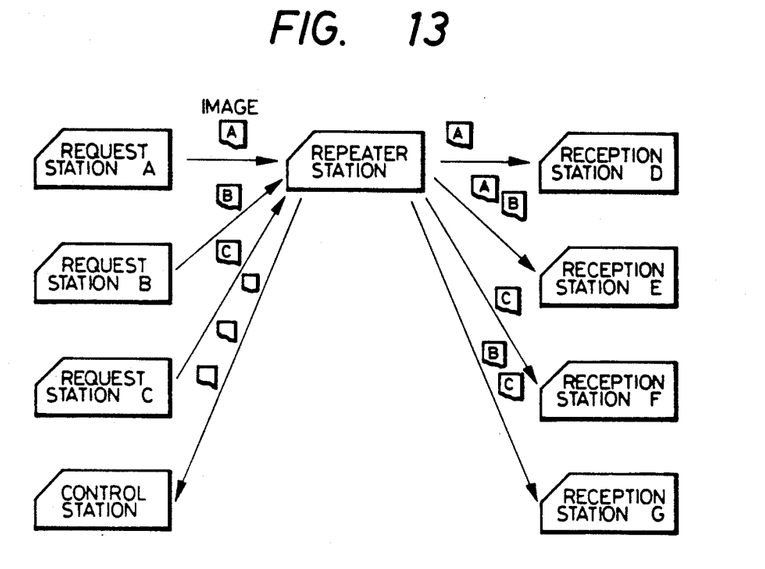
Figure 14:
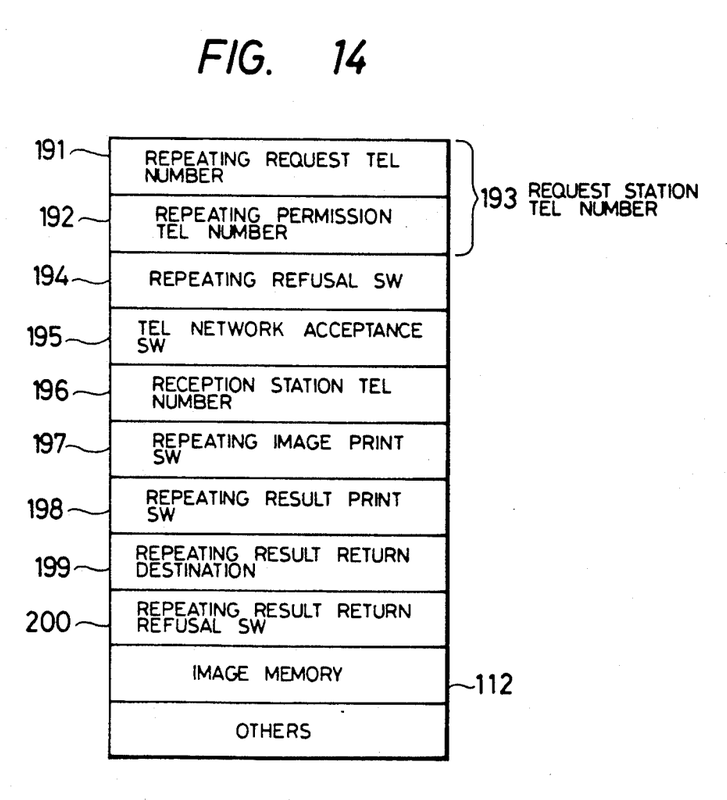

Another embodiment in the case where a part of the operation of the repeating multiple-address transmission in the foregoing embodiment was changed will now be described. This embodiment differs from the foregoing embodiment with respect to the control operation of the CPU 114. FIG. 12 shows an operation flowchart for the repeating multiple-address transmission of the CPU 114 in another embodiment. The control program for this flow is also stored in the ROM 111. FIG. 13 is an explanatory diagram of the operation of the repeating multiple-address transmission. FIG. 14 is an explanatory diagram of an internal region of the RAM 113.

In the foregoing constitution, when the repeater station starts the operation of the repeating multiple-address transmission, it first performs the memory reception (S 114). The repeater station then checks whether the repeating image print SW in the RAM which is set in the apparatus itself has been set to ON or OFF (S 115). If it has been set to ON, the repeating image is printed (S 116). If it has been set to OFF, the repeating image is not printed but the next operation is executed. The repeater station selects the partner multiple-address reception station which has previously registered in the repeater station in accordance with the request station TEL number and performs the repeating multiple-address transmission (S 117). After completion of the transmission, the processing routine advances to the operation to return the repeating result (S 118). The repeater station discriminates the data stored in the region of a repeating result return refusal SW 200 in the RAM 113 set in the self apparatus (S 119). If the repeating result return refusal SW 200 has been set to ON, the repeating result is printed (S 122) and the processing routine is finished. If it has been set to OFF, the operation to return the repeating result is performed and the repeating result is returned to the repeating result return destination which has previously been registered in the repeater station in accordance with the request station TEL number (S 120). Thereafter, the data of a repeating result print SW 198 of the RAM 113 set in the self apparatus is discriminated (S 121). If the print SW 198 has been set to ON, the repeating result is printed. If it has been set to OFF, the repeating result is not printed but the operation is finished.

As described above, the operation proceeds according to the flowchart of FIG. 12, for example, when the operating mode of the repeater station has been set in the following manner:

(1) the reception stations are D and E for the request station A and the repeating result return destination is H;

(2) the reception stations are E and G for the request station B and the repeating result return destination is H;

(3) the reception stations are F and G for the request station C and the repeating result return destination is H;

(4) the repeating result image print and the repeating result print are performed; or (5) the repeating result return is not refused; if repeating instructions and image signals are sent from the request stations A, B, and C, the image signals flow as shown in FIG. 13. All of the repeating results are sent to the control station H. The images repeated and the repeating results are printed in the repeater station.

According to the embodiment as described above, the following effects are obtained.

(1) Requests for the repeating other than the repeating of the request station which has previously been registered are not accepted in the repeater station. Thus, it is possible to avoid the repeating instruction which can exert adverse influences on the repeater station from an erroneous or wrong repeating instruction station, the other request stations constituting the repeating multiple-address transmission network together with such a repeater station, the reception station, and the like. The multiple-address reception station is preliminarily registered in the repeater station. Thus, the request in the repeating request station can be simplified. A fixed repeating multiple-address transmission network can be established.

(2) After characters such as, e.g., "( )", "—", and the like other than the numerals 0 to 9 were deleted, the request station TEL number registered in the repeater station is compared with the request station TEL number declared in the TSI signal on the request station side. Thus, it is possible to avoid from the erroneous comparison.

(3) The request station TEL number registered in the repeater station is compared with the request station TEL number declared in the TSI signal on the request station side with respect to only the lower few digits. Thus, for example, it is possible to avoid from the erroneous comparison by the toll station number or the like.

(4) The repeating result is returned to the request station TEL number registered in the repeater station. Thus, the repeating result can be certainly returned to the request station TEL number by distinguishing whether the partner is at the local station or at the toll station, or the like.

(5) By adding the repeating refusal function to the repeater station, the repeater station can be protected from the one-sided repeating request from the repeating request station.

(6) In the repeater station, the presence or absence of the repeating image print is decided by the operator of the repeater station, thereby enabling the necessary repeating result to be secured or enabling the unnecessary repeating result to be eliminated.

(7) The repeating result can be also returned to the stations other than the request station. Thus, for example, it is possible to provide a control station or the like to control one or a plurality of repeating multiple-address transmission networks.

(8) The return of the repeating result can be refused in the repeater station. Therefore, for example, for a repeating request from abroad or the like, an amount of use of the telephone circuit can be reduced and the costs which are required for the communication and the like can be reduced.

(9) The multiple-address reception station destination which has previously been registered can be selected in accordance with the request station TEL number and the repeating multiple-address transmission is performed. Thus, for example, the repeater station can be located as the repeater station of a plurality of facsimile repeating multiple-address transmission networks and can perform the repeating multiple-address transmission.

(10) In the repeater station, by deciding whether the repeating result is printed or not, only the necessary result can be printed on the basis of the decision of the repeater station. Resources can be saved.

Although the facsimile apparatus has been described as an example in the foregoing embodiment, the invention is not limited to the facsimile apparatus but can be also applied to other data communication apparatuses such as telex and the like.

We claim:

1. A data communication apparatus comprising:
receiving means for receiving, from one data communication terminal, first identification data representing said one data communication terminal and image data transmitted from said one data communication terminal;
first memory means for storing second identification data representing relay transmission request sources;
second memory means for storing the image data received by said receiving means;
third memory means for storing, in correspondence with the first identification data representing said one data communication terminal, a plurality of third identification data respectively representing a plurality of data communication terminals, said third memory means previously storing the plurality of third identification data manually input by an operator without receiving the third identification data from said one data communication terminal and before line connection is made to said one data communication terminal for receiving the first identification data and image data;
judgment means for judging whether or not the first identification data received by said receiving means coincides with the second identification data stored in said first memory means; and
transmission means for transmitting, when it is judged by said judgment means that said first and second identification data coincides with each other, on the basis of the plurality of third identification data stored in said third memory means, the image data stored in said second memory means to said plurality of data communication terminals,
wherein when it is judged by said judgment means that said first and second identification data do not coincide with each other, said transmission means executes a relay transmission process in accordance with a relay transmission request from said one data communication terminal.

2. A data communication apparatus according to claim 1, wherein the first identification data includes dial number data.

3. A data communication apparatus according to claim 1, wherein said transmission means transmits the same image data stored in said first memory means to said plurality of data communication terminals.

4. A data communication apparatus according to claim 1, further comprising informing means for informing a transmission result of said transmission means to said one data communication terminal.

5. A facsimile apparatus which has a relay transmission function wherein image data transmitted from a transmission-side facsimile apparatus is transmitted to a reception-side facsimile apparatus, comprising:
reception means for receiving the image data and a first identification signal which represents said transmission-side facsimile apparatus, both the image data and the identification signal being transmitted from said transmission-side facsimile apparatus;

first storage means for storing a second identification signal which represents one communication partner;

second storage means for storing, in correspondence with said transmission-side facsimile apparatus, dial information of said reception-side facsimile apparatus at which the image data is to be received, said second storage means having previously stored the dial information manually input by an operator without receiving the dial information from said transmission-side facsimile apparatus and before line connection is made to said transmission-side facsimile apparatus;

judgment means for judging whether or not the first identification signal received by said reception means coincides with the second identification signal stored in said first storage means; and transmission means for transmitting, when it is judged by said judgment means that the first and second identification signals coincide with each other, the image data transmitted from said transmission-side facsimile apparatus to said reception-side facsimile apparatus represented by the dial information stored in said second storage means, irrespective of a presence or absence of a relay transmission request from said transmission-side facsimile apparatus, wherein when it is judged by said judgment means that the first and second identification signals do not coincide with each other, said transmission means executes a relay transmission process in accordance with the relay transmission request from said transmission-side facsimile apparatus.

6. An apparatus according to claim 5, further comprising an image memory for storing the image data received by said reception means, and wherein said transmission means transmits the image data stored in said image memory to the reception-side facsimile apparatus.

7. An apparatus according to claim 4, wherein said reception means receives, in a form of a transmission subscriber identification (TSI) signal, the first identification signal which represents the transmission-side facsimile apparatus, and said judgment means judges whether the first identification signal represented by the TSI signal coincides with a TSI signal stored in said first storage means.

* * * * *

UNITED STATES PATENT AND TRADEMARK OFFICE
CERTIFICATE OF CORRECTION

PATENT NO. : 5,170,428
DATED : December 8, 1992
INVENTOR(S) : TSUNEHIRO WATANABE, ET AL.

It is certified that error appears in the above-identified patent and that said Letters Patent is hereby corrected as shown below:

TITLE PAGE

IN [56] REFERENCES CITED

Under U.S. PATENT DOCUMENTS, "4,000,391  12/1976  Ogawa" should read --4,000,371  12/1976  Ogawa--.

COLUMN 1

Line 23, "calls" should read --calls,--.
Line 27, "such" should be deleted.
Line 29, "such" should be deleted.

COLUMN 7

Line 11, "the" (second occurrence) shoudl be deleted.

COLUMN 10

Line 38, "coincides" should read --coincide--.

UNITED STATES PATENT AND TRADEMARK OFFICE
CERTIFICATE OF CORRECTION

PATENT NO. : 5,170,428
DATED : December 8, 1992
INVENTOR(S) : TSUNEHIRO WATANABE, ET AL.

It is certified that error appears in the above-identified patent and that said Letters Patent is hereby corrected as shown below:

<u>COLUMN 12</u>

Line 17, "claim 4," should read --claim 5,--.

Signed and Sealed this

Twenty-third Day of November, 1993

Attest:

BRUCE LEHMAN

Attesting Officer     Commissioner of Patents and Trademarks